United States Patent
Kumbla et al.

(10) Patent No.: US 7,881,004 B2
(45) Date of Patent: Feb. 1, 2011

(54) ADAPTIVE TRACK SHAPE CONTROL DURING SELF SERVO-WRITE

(75) Inventors: Kishan K. Kumbla, Morgan Hill, CA (US); Steven Smith, Santa Clara, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/212,841

(22) Filed: Sep. 18, 2008

(65) Prior Publication Data

US 2010/0067134 A1    Mar. 18, 2010

(51) Int. Cl.
G11B 21/02    (2006.01)

(52) U.S. Cl. .................. 360/75; 360/31; 360/77.02; 360/77.04; 360/78.04

(58) Field of Classification Search ............ None
See application file for complete search history.

(56) References Cited

U.S. PATENT DOCUMENTS

| | | | | |
|---|---|---|---|---|
| 5,854,722 A * | 12/1998 | Cunningham et al. | .... | 360/77.04 |
| 5,930,067 A * | 7/1999 | Andrews et al. | ......... | 360/77.04 |
| 6,487,035 B1 * | 11/2002 | Liu et al. | ................. | 360/77.04 |
| 6,563,663 B1 * | 5/2003 | Bi et al. | .................... | 360/77.04 |
| 6,608,731 B2 * | 8/2003 | Szita | .......................... | 360/75 |
| 6,631,046 B2 | 10/2003 | Szita et al. | | |
| 6,657,810 B1 * | 12/2003 | Kupferman | .............. | 360/77.04 |
| 6,768,609 B2 * | 7/2004 | Heydt et al. | .............. | 360/77.08 |
| 6,894,862 B2 * | 5/2005 | Kusumoto | ............... | 360/77.04 |
| 6,937,424 B2 * | 8/2005 | Chang et al. | ............. | 360/77.04 |
| 6,977,792 B1 * | 12/2005 | Melrose et al. | ............... | 360/75 |
| 6,992,853 B2 * | 1/2006 | Chang | .................... | 360/77.02 |
| 7,016,140 B1 | 3/2006 | Schultz et al. | | |
| 7,085,094 B1 * | 8/2006 | Heimbaugh et al. | ...... | 360/77.04 |
| 7,088,547 B1 * | 8/2006 | Wang et al. | ............... | 360/77.04 |
| 7,119,981 B2 * | 10/2006 | Hanson et al. | ........... | 360/77.04 |
| 7,133,239 B1 | 11/2006 | Hartman et al. | | |
| 7,139,149 B1 * | 11/2006 | Sun et al. | .................. | 360/77.04 |
| 7,161,759 B1 | 1/2007 | Zhang et al. | | |
| 7,199,956 B1 * | 4/2007 | Moser et al. | ................... | 360/46 |
| 7,283,321 B1 * | 10/2007 | Sun et al. | .................. | 360/78.05 |
| 7,286,316 B2 * | 10/2007 | Sai et al. | ........................ | 360/75 |
| 7,333,280 B1 * | 2/2008 | Lifchits et al. | ................. | 360/51 |
| 7,433,148 B2 * | 10/2008 | Wong | ....................... | 360/77.04 |
| 7,576,941 B1 * | 8/2009 | Chen et al. | ................ | 360/77.04 |
| 7,583,470 B1 * | 9/2009 | Chen et al. | ................ | 360/77.04 |
| 2002/0030920 A1 * | 3/2002 | Min et al. | ................. | 360/77.04 |
| 2004/0125491 A1 * | 7/2004 | Iseri et al. | ...................... | 360/75 |

(Continued)

OTHER PUBLICATIONS

Zhao, et al., "A Novel Method to Restrain the Radial Error Propagation in Self-servowriting in Hard Disk", *Proceedings of the IEEE International Conference on Automation and Logistics*, (Aug. 18, 2007),2736-2739.

(Continued)

*Primary Examiner*—Dismery E Mercedes

(57) ABSTRACT

In a method for implementing track shape control during a self servo-write process, an error in a targeted path for writing servo data onto a first track of a disk is detected. The error is correlated with a second error for a targeted path in a previously written track of the disk. A correction is generated for a feed-forward signal used to position a writing element which is used to write servo data for a subsequent track of the disk.

10 Claims, 11 Drawing Sheets

U.S. PATENT DOCUMENTS

| | | | |
|---|---|---|---|
| 2007/0096678 A1* | 5/2007 | Melrose | 318/652 |
| 2007/0121235 A1* | 5/2007 | Sai et al. | 360/51 |
| 2007/0247737 A1 | 10/2007 | Manzer | |
| 2008/0030894 A1 | 2/2008 | Sun et al. | |
| 2008/0112073 A1* | 5/2008 | Shelton | 360/77.04 |

OTHER PUBLICATIONS

Melkote, et al., "Modeling and Control for Self-servowriting in Hard Disk Drives: A Repetitive Process Approach", *Proceedings of the 2006 American Control Conference*, (Jun. 14, 2006),2005-2008.

Nakamura, et al., "Control Design for Self Servo Track Writer using Estimation of the Head Position", *IEEE International Workshop on Advanced Motion Control*, (2006),99-102.

Teoh, et al., "R/W Gap Delay Estimation for Self-servo Track Writing", *IEEE International Workshop on Advanced Motion Control*, (2006),149-152.

* cited by examiner

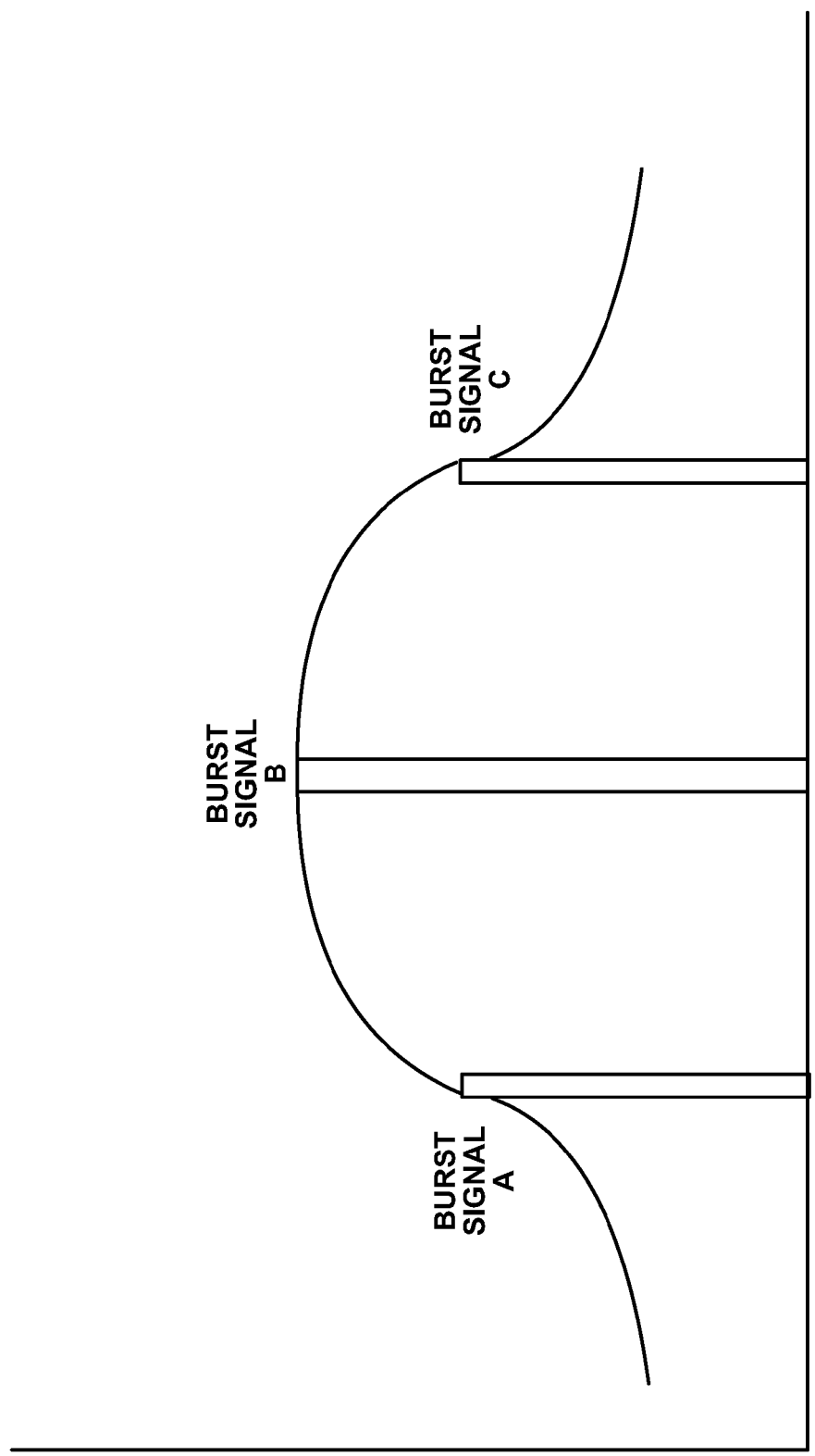

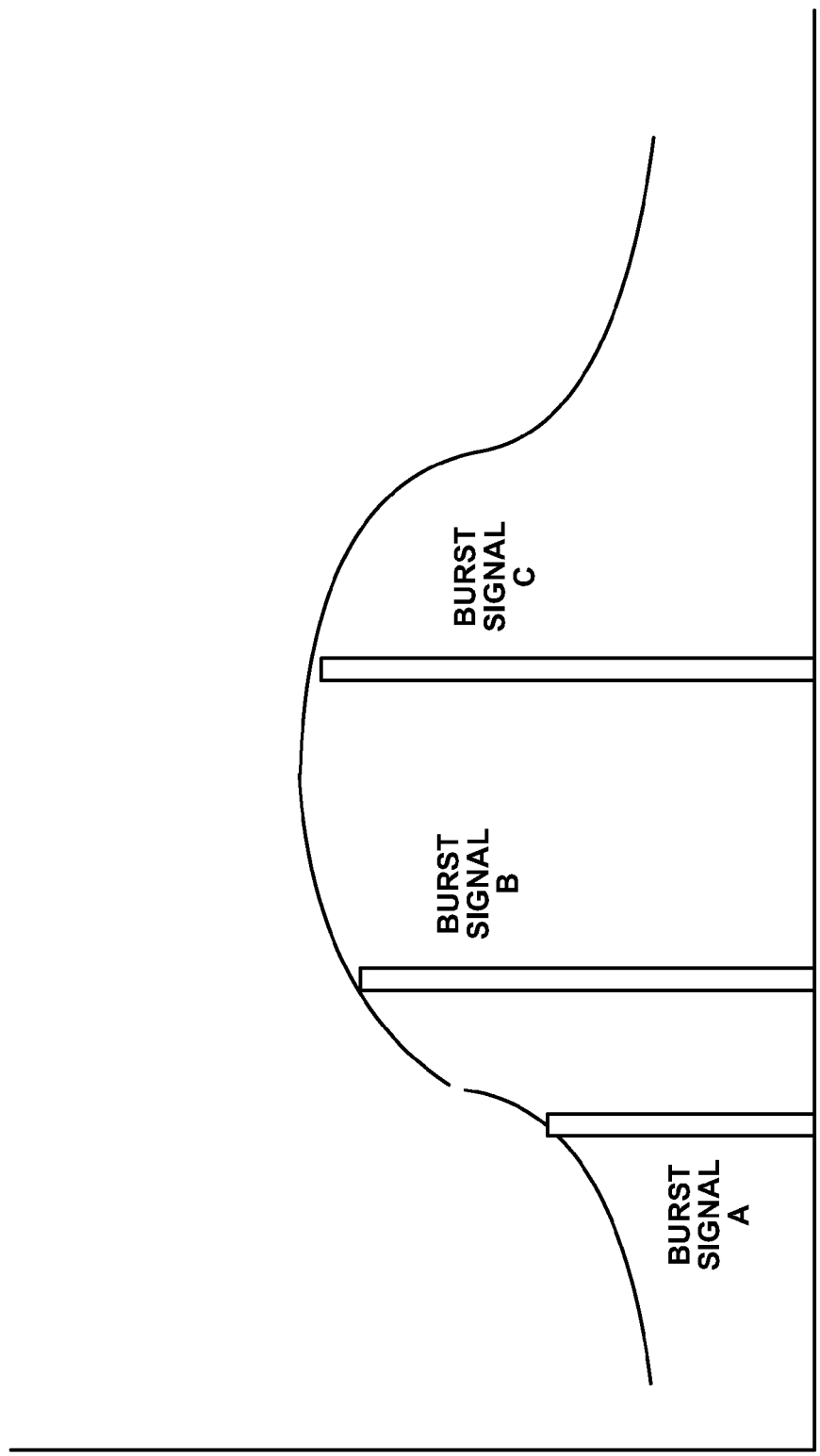

ADAPTIVE TRACK SHAPE CONTROL DURING SELF SERVO-WRITE

TECHNICAL FIELD

The present invention relates to the field of self servo-writing a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider includes a head assembly that has a magnetic read/write transducer or head for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

To read data from a disk, a magnetic head must remain centered on a data track. Typically, this is performed by using position information called servo codes written onto to the disk which is then read by the head. A feedback system uses the servo codes to maintain the position of the head relative to a desired data track. Current industry trends are looking for ways to increase the data density of hard disk drives. One method is to reduce the track pitch and thereby increase the density of tracks on the disk. As a result, precise writing of servo data onto the disk is important.

Previously, dedicated servo-writing devices were used to write the servo data onto the disk. However, due to the reduced size of hard disk drives, and the need for the covers to be in place for proper operation of many drives, a process known as self servo-writing is often used. In the self servo-writing process, the read/write heads of the hard disk drive are used to write the servo data onto the disks. Typically, a position signal is used to servo control the actuator for the read/write head is derived from a closed loop control system which monitors the readback amplitude of patterns (e.g., a position error signal (PES)) that were written in a previous step. The shape of the previously written track is derived based upon the PES using a transfer function, which represents the behavior of the actuator in response to a signal. Once the shape of the track is known, a feed-forward signal is generated which will compensate for errors in the shape of the previously written track. The feed-forward signal controls the position of the actuator when subsequent servo data is written for a track. Optimally, any errors in the shape of the track just written will be eliminated in the subsequent track due to the corrections provided by the feed-forward signal.

Thus, the feed-forward signal is based upon modeling the mechanical behavior of the hard disk drive due to excitations to the control loop. However, there is often some error in measuring the PES and accurately deriving a feed-forward signal which will effectively eliminate track shape errors in subsequent tracks. Thus, a minor distortion in the track shape will magnify in subsequently written tracks if it is not identified and corrected.

SUMMARY OF THE INVENTION

In a method for implementing track shape control during a self servo-write process, an error in a targeted path for writing servo data onto a first track of a disk is detected. The error is correlated with a second error for a targeted path in a previously written track of the disk. A correction is generated for a feed-forward signal used to position a writing element which is used to write servo data for a subsequent track of the disk.

BRIEF DESCRIPTION OF THE DRAWINGS

FIGS. 3B and 3C show example position error signals of burst patterns disposed upon a disk surface.

DETAILED DESCRIPTION

Figure 1:
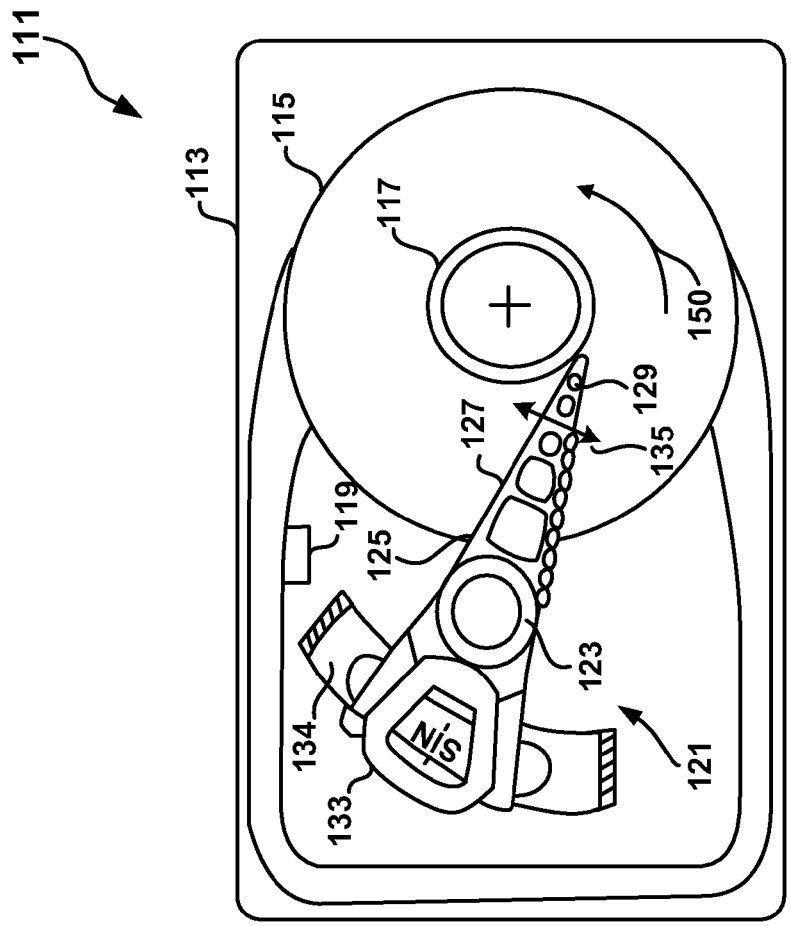
FIG. 1 is a schematic top plan view of a hard disk drive, in accordance with one embodiment of the present invention.

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "detecting," "correlating," "generating," "determining," "performing," "accessing," "assigning," "selecting," "using" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with a brief overview of disk drive operation, focusing on the slider as it is utilized in the disk drive. Following this, a discussion of factors affected self servo-write performance will be discussed followed by a discussion of embodiments in accordance with the present invention.

FIG. 1 shows a schematic drawing of one embodiment of an information storage system comprising a magnetic hard disk file or drive 111 for a computer system. Drive 111 has an outer housing or base 113 containing a disk pack having at least one media or magnetic disk 115. A spindle motor assembly having a central drive hub 117 rotates the disk or disks 115 in the direction shown by arrow 150. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown in FIG. 1, each arm 125 has extending from it at least one cantilevered integrated lead suspension (ILS) 129. The ILS 129 may be any form of lead suspension that can be used in a data access storage device, such as a hard disk drive (HDD). A slider 230 (see FIGS. 2A and 2B) is usually bonded to the end of ILS 129, both of which are attached to a suspension 127. The level of integration containing the slider, suspension, ILS, and read/write head (not shown) is called the head gimbal assembly (HGA).

The ILS 129 has a spring-like quality, which biases or presses the air-bearing surface of the slider 230 (see FIGS. 2A and 2B) against the disk 115 to cause the slider 230 (see FIGS. 2A and 2B) to fly at a precise distance from the disk 115. The ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

Figure 2A:
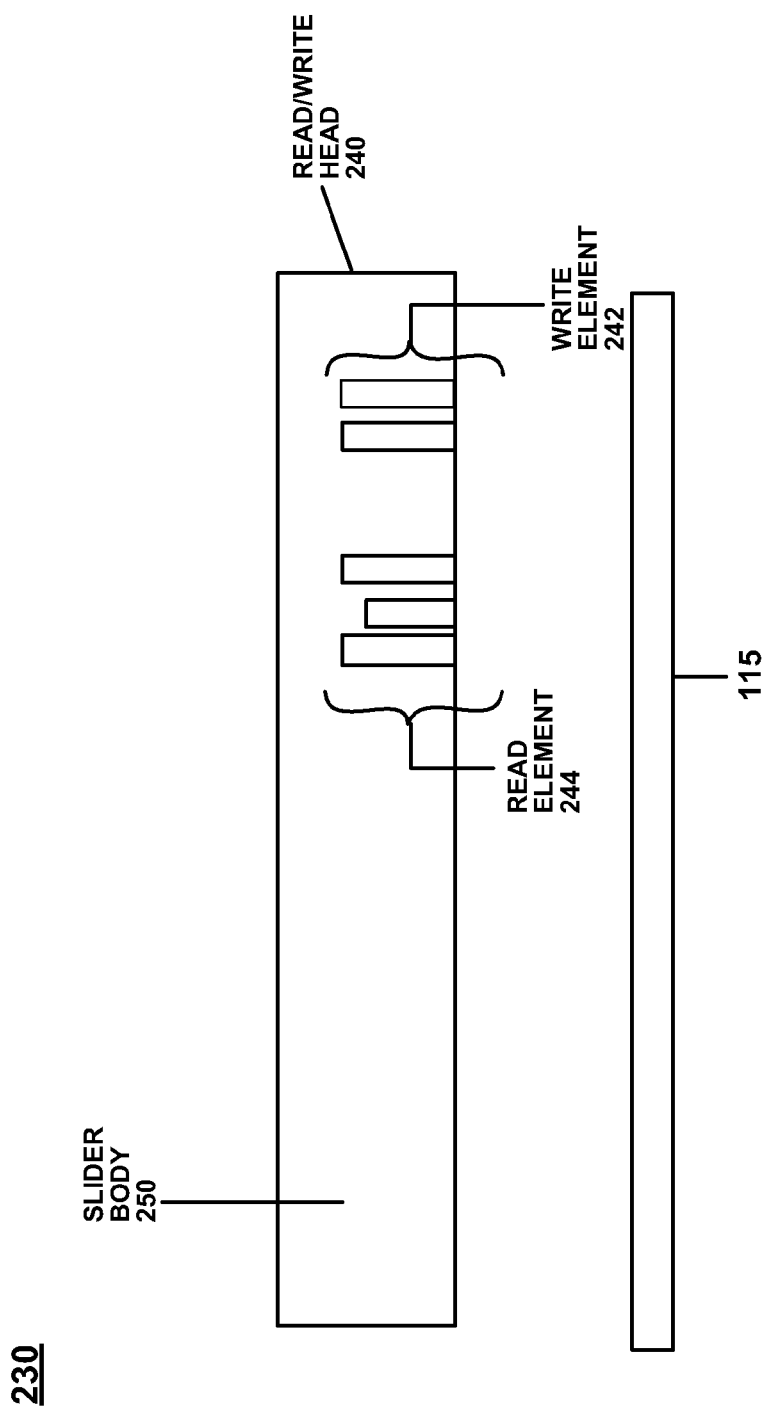
FIG. 2A shows an example slider 230 in accordance with an embodiment of the present invention.
Figure 2B:
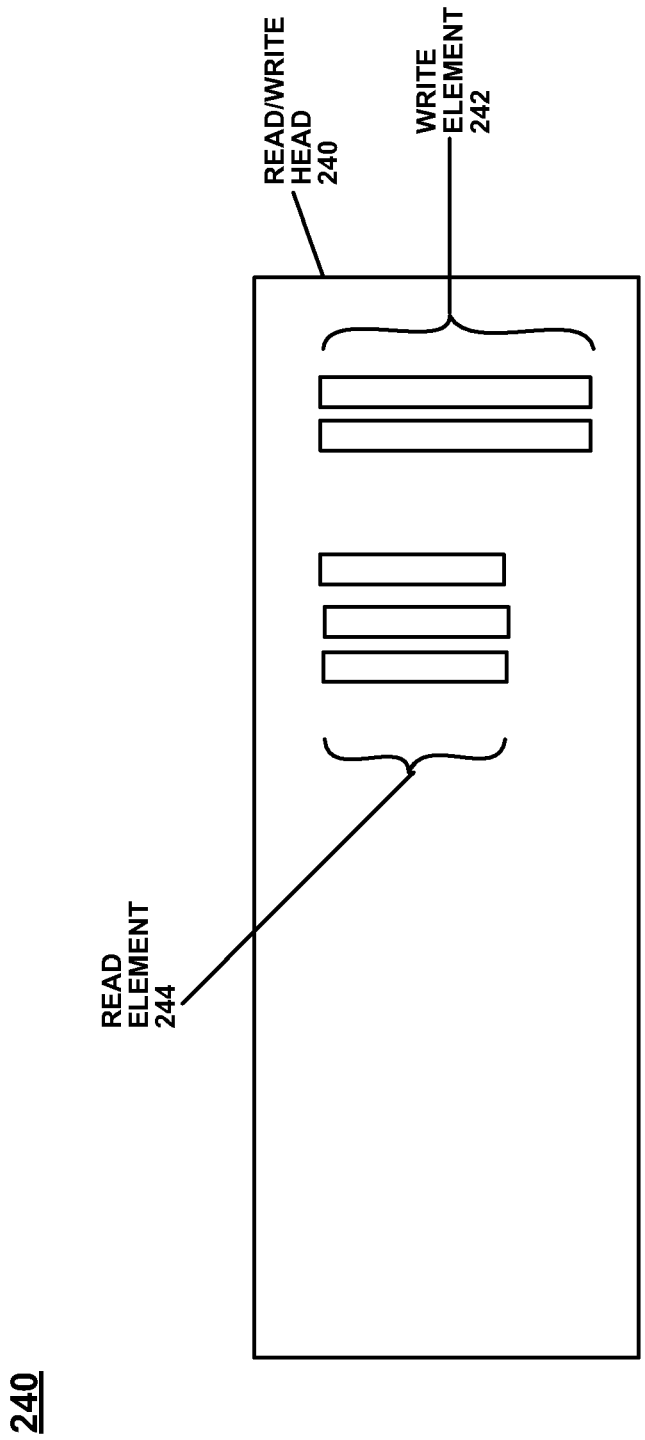
FIG. 2B shows a bottom view of an example read/write head 240 in accordance with an embodiment of the present invention.

FIG. 2A shows an example slider 230 in accordance with an embodiment of the present invention. In FIG. 2A, slider 230 comprises a read/write head 240 and a slider body 250. Slider 230 is designed to fly in close proximity to the surface of disk 115. For example, the fly height of slider 230 can be as little as three nanometers above the surface of disk 115. Write element 242 is disposed ahead of read element 244 with reference to the direction of travel of disk 115 relative to read/write head 240. FIG. 2B shows a bottom view of an example read/write head 240 in accordance with an embodiment of the present invention. As shown in FIG. 2B, the center of read element 244 is offset from the center of write element 242. Thus, the read/write offset of read element 244 relative to write element 242 can be described as having an X component 251 and a Y component 252. Due to the geometry of the HGA as it moves from the inside diameter of disk 115 to the outside diameter, the values of X component 251 and Y component 252 of the read/write offset will change from track to track. This change in the read/write offset can change significantly every 12-50 tracks of disk 115.

On the surface of the magnetic disk are formed a plurality of concentric tracks with a predetermined track width in a radial direction. A plurality of servo areas extend from the inside diameter of the magnetic disk in a radial direction and divide each of the tracks into data sectors. Thus, the servo areas and the data areas are alternately disposed around each track. Each servo area stores data for controlling the position of the head of the HGA while each data area stores user data.

Figure 3A:
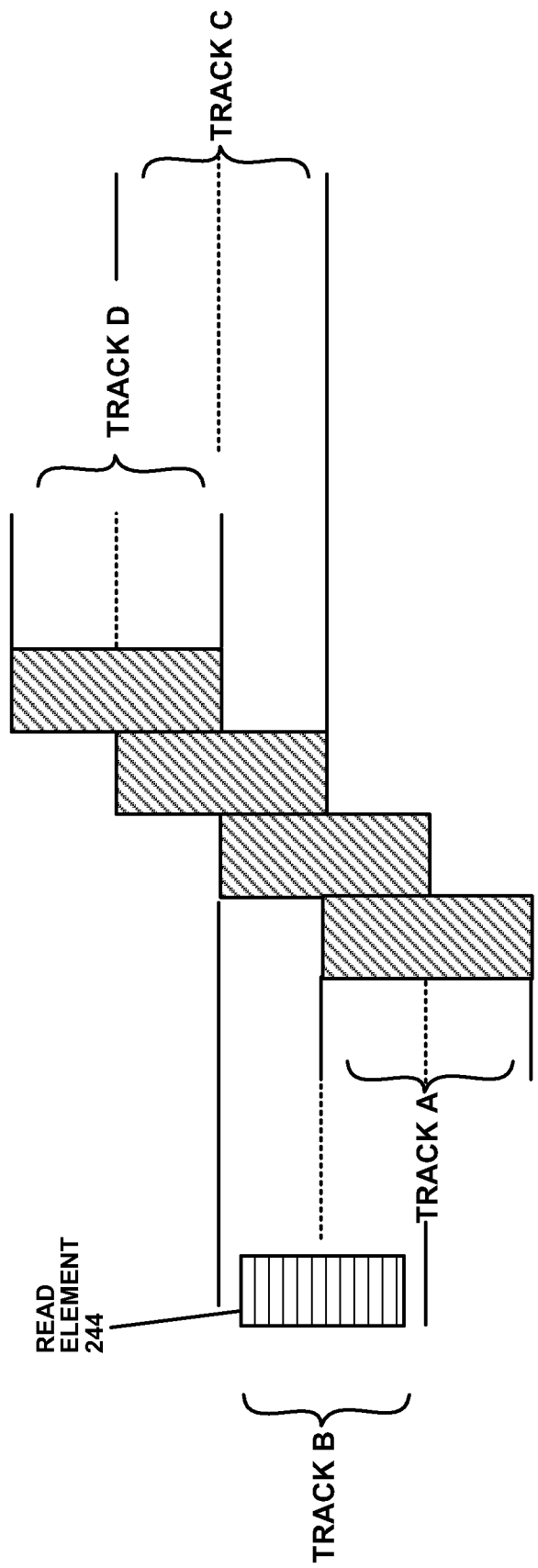
FIG. 3A shows burst pattern regions of a plurality of tracks in accordance with embodiments of the present invention.

Referring now to FIG. 3A, when writing a servo pattern on a disk, a first track, including the servo data shown in FIG. 3A, adjacent to the crash stop at the internal diameter of disk 115 using the write element of the read/write head. The servo data for a track is written (e.g., track A) onto the servo areas for that track. The read/write head is moved to a new position to write a second track (e.g., track B). Typically, the read head is positioned over a track that has been written previously (e.g., track A) and the servo pattern of track A is used to control the positioning of the write element when writing the servo data for track B. Drive 111 maintains the position of the writing element above a desired track using a position error signal (PES). The PES indicates the amplitude of the signals from the burst regions and is used to determine how far write element varies from the desired track. Because this operation is performed by disk drive 111 itself, rather than using dedicated servo writer equipment, it is typically referred to as a self servo-write process. Burst patterns A, B, C, and D are referred to as "propagation patterns" because they are used in the propagation of tracks in the self servo-write process. Subsequently, a product pattern is written onto disk 115 which is used as the servo pattern when data is written to, or read from, disk 115.

The burst pattern stored in the burst field is made up of, for example, 4 types of burst patterns. In the example of FIG. 3A, burst patterns A, B, C, and D are shown. It is noted that the representation of burst patterns shown in FIG. 3A is only intended as an example for the purpose of discussion and that embodiments in accordance with the present invention can use more or less than 4 burst patterns. As shown in FIG. 3A, the burst patterns A, B, C, and D are signals written in areas which span two adjacent track centers (TC) at regular intervals. As shown in FIG. 3A, a read element 244 of read/write head 240 is centered over track B. When read element 244 passes over the burst patterns, bursts A, B, and C appear as high frequency signals within a certain period of the rotation frequency of disk 115.

FIG. 3B shows a position error signal of track B as detected by read element 244. As shown in FIG. 3B, the signal from burst B is fully saturated while the signals from bursts A and C are both at 0.5. Thus, in order to keep read element 244 properly centered over track B, an operation is performed to keep the values of the amplitudes of signals A and C equal. It is noted that due to changes in the read/write offset as read/write head writes servo tracks from the inside diameter of disk 111 to the outside diameter, the relative amplitudes of bursts A and C of other tracks will change as well.

FIG. 3C shows a position error signal of track B as detected by read element 244. As shown in FIG. 3C, the amplitudes of bursts A, B, and C have shifted due to a tracking error of read/write head 240 with respect to track B. More specifically, the amplitude of bursts A and B have decreased while the amplitude of burst C has increased. This indicates that the position of read element 244 is shifted in the direction of burst C. This shift in the relative amplitudes of burst signals A, B, and C may be due to the read/write offset of write element 242 with respect to read element 244, as well as the geometry of arm(s) 125 and disk 115, or due to improper tracking of track B by read/write head 240.

While it is desired to create absolutely round tracks, a number of factors often create disturbances which affect either of disk 111 and/or HGA 129. In other words, these disturbances cause the servo data to be mis-positioned on disk 115. As a result, the servo data written onto disk 111 does not actually describe a perfectly round track. Additionally, as each succeeding servo track is positioned based upon a previously written servo track, an error in the track shape can be magnified in succeeding tracks.

To reduce the errors in track shape, a transfer function is derived in which models the behavior of disk drive 111. For example, a signal can be generated to change the position of read element 244 a known distance while recording the PES signal from read element 244. Because the distance read element 242 is moved (e.g., an input) is known and the corresponding change in the PES (e.g., an output) is measured, a function can be derived which describes the relationship between the position of read element 244 and the corresponding change in the PES recorded by read element 244. Thus, for a given input describing the position of read element 244, the transfer function will result in a corresponding output describing the PES signal from read element 244. Additionally, the transfer function can be used to derive the shape of a track based upon the servo data. In other words, the PES data can be used as an input to the inverse transfer function to derive an output describing the position of read element 244. As a result, the shape of a track can be derived using the servo data written to disk 115 and deviations from the desired track shape can be detected.

Based upon an analysis of the shape of a given track, a correction signal can be input when the servo data for a subsequent track is written to disk 115. For example, a signal can be input to change the position of write element 242 as servo data for a subsequent track is written onto disk 115. The transfer function is used to determine a correction factor, or f-factor, which compensates for the error detected in the shape of the track. Determination of the f-factor is based upon converting an error in the shape of a track into a harmonic frequency of the rotation frequency, or fundamental frequency, of the disk. The f-factor is selected to null the error in the frequency domain. This f-factor is then used in generating a feed-forward signal to control the positioning of write element 242 when servo data for a subsequent track is being written onto disk 115. Thus, corrections in the self servo-write process identify the behavior of disk drive 111 in a closed-loop system which measures the PES signal, determines an f-factor to compensate for an error(s) in track shape, and generates a feed-forward signal used to control the position of the write element when a subsequent track is written. Unfortunately, the transfer function does not always model the behavior of disk drive 111 with a sufficient degree of precision. This therefore leads to errors in the track shape which are repeated from track to track as the self servo-write process continues. Again, these errors in the track shape are often magnified in succeeding tracks.

Figure 4:
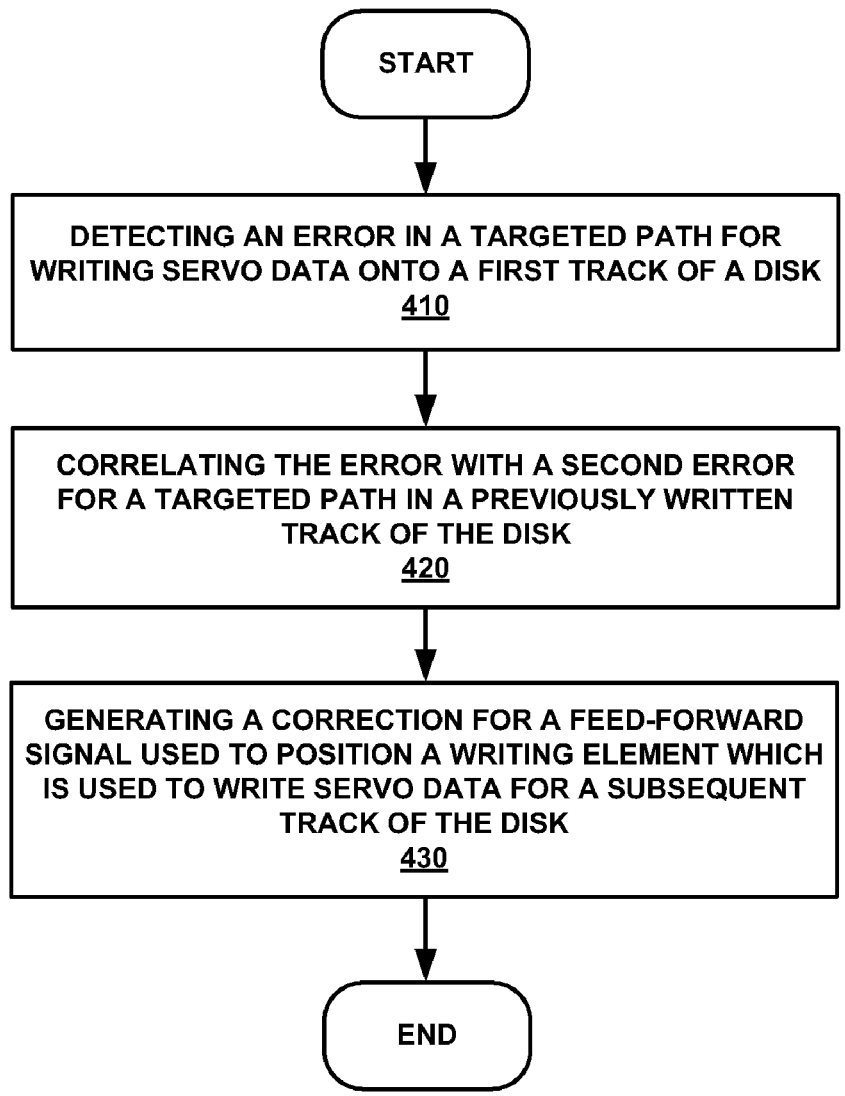
FIG. 4 is a flowchart of a method of adaptive track shape control during a self servo-write process in accordance with an embodiment of the present invention.

FIG. 4 is a flowchart of a method 400 of adaptive track shape control during a self servo-write process. In operation 410 of FIG. 4, an error in a targeted path for writing servo data onto a first track of a disk is detected. In accordance with an embodiment of the present invention, the PES signals of the servo data from a plurality of tracks are collected. A targeted path is considered correct if no control action would be required to follow it in the absence of non-repeating errors with regard to disk rotation period. If the targeted path is not considered correct, some portion of the error in the shape of the track is due to its shape. Thus, the errors which cannot be attributed to non-repeating errors are possibly attributable to an error in the transfer function. This in turn results in an incorrect determination of the f-factor used to correct the positioning of the write element when subsequent tracks are written.

In operation 420 of FIG. 4, the error is correlated with a second error for a targeted path in a previously written track of the disk. In accordance with an embodiment of the present invention, it is assumed that non-repeating errors in the track shape will not correlate with an error in the track shape of subsequently written tracks. In other words, non-correlated errors should be uncorrelated from propagation step to the next. Thus, correlated errors in the track shapes may be attributable to imperfect target paths. The target path is calculated as a function of the error(s) observed when writing servo patterns that are used to propagate subsequent servo patterns. An improper target paths may be caused by minute errors in determining the transfer function with a sufficient degree of precision. These minute errors cause correspondingly minute errors in the track shape which can be magnified as succeeding tracks are written onto the disk based upon the servo patterns previously written onto the track. In accordance with embodiments of the present invention, if correlations are observed in the tracking errors when servo patterns are written, it is an indication that the transfer function, and thus the f-factor used to correct track errors, can be improved to remove the correlation.

Figure 5:
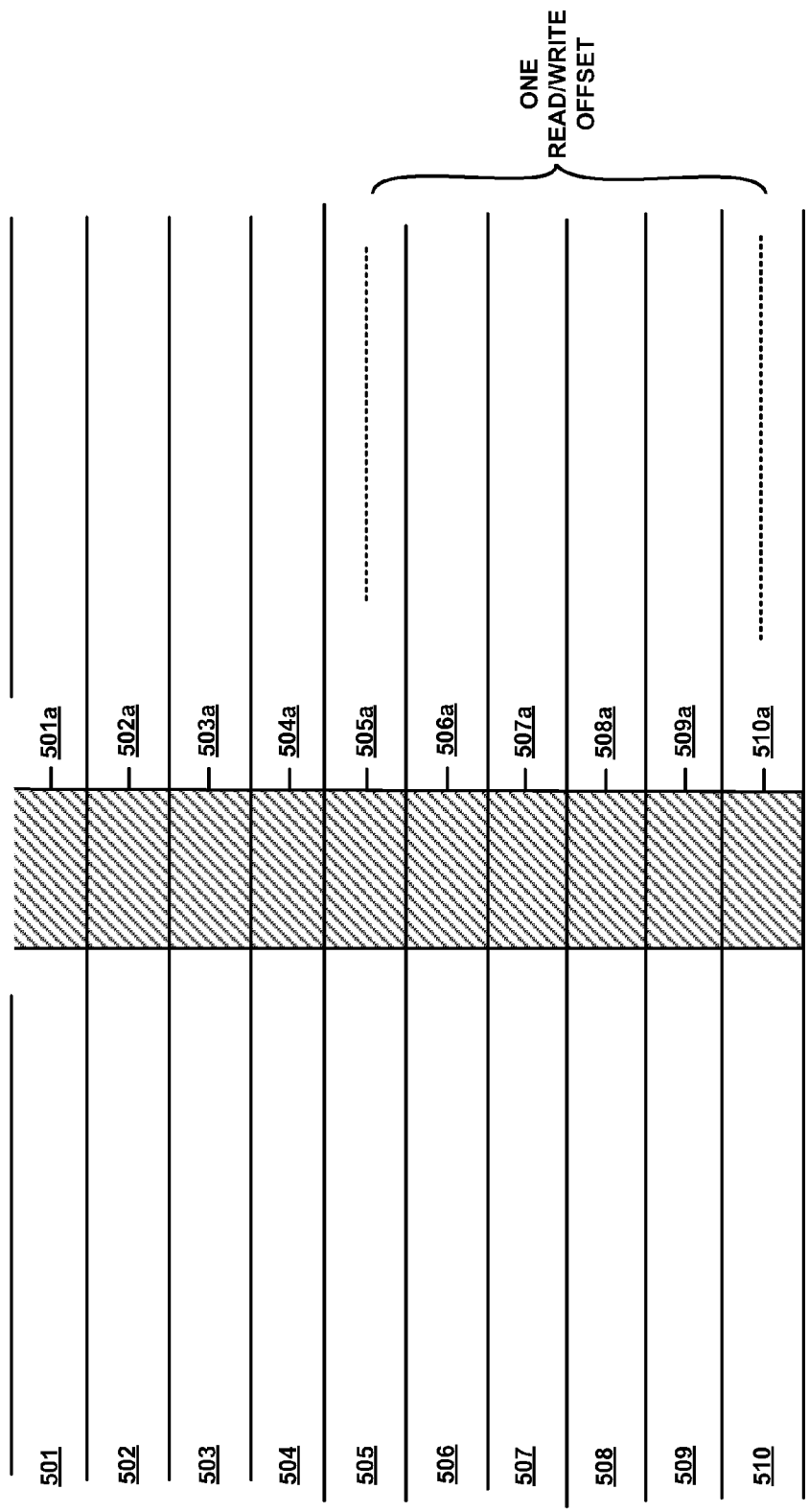
FIG. 5 shows a plurality of tracks written onto a disk in accordance with one embodiment of the present invention.

In operation 430 of FIG. 4, a correction is generated for a feed-forward signal used to position a writing element which is used to write servo data for a subsequent track of the disk. In accordance with embodiments of the present invention, if correlations are observed in the tracking errors when servo patterns are written, it is an indication that the transfer function, and thus the f-factor used to correct track errors, can be improved to remove the correlation. As a result, embodiments of the present invention generate a correction to the feed-forward signal used to position the writing element which is being used to write servo patterns for subsequent tracks. As a result, the correlated errors from the targeted path for subsequent tracks will be reduced, or eliminated, in subsequently written tracks. Some previous methods measured the transfer function on a track-by-track basis and generated a new f-factor based upon the newly measured transfer function. However, because they generate corrections on a track-by-track basis, they are not well suited to determine whether the transfer function itself is responsible for some of the error in the track shape. In accordance with embodiments of the present invention, a correlation between tracks is detected to determine whether there is an error in the transfer function. As a result, the f-factor is corrected and is used in a feed-forward signal to control the write element when writing a subsequent servo track As an example of an embodiment in accordance with the present invention, the PES of a first track is measured as well as the PES of a track which is separated from the first track by one read/write offset. As described above, the read/write offset describes the distance between the read element of a read/write head and the write element of the read/write head. The read/write offset will change as ILS 129 moves from an inside diameter of disk 115. With reference to FIG. 5, the PES of tracks 501, 502, 503, 504, 505, 506, 507, 508, 509, and 510 are measured from corresponding servo pattern areas 501a-510a. Assuming a read/write offset of 5 tracks for the portion of disk 115 represented in FIG. 5, the PES of track 510 is compared with the PES of track 505. Similarly, the PES of tracks 509 ad 504 are compared, the PES of tracks 508 and 503 are compared, the PES of tracks 507 and 504 are compared, the PES of tracks 506 and 501 are compared, and the PES of tracks 505 and 500 are compared.

The comparison of PES signals from tracks one read/write offset apart facilitates determining if there is a correlation between errors in the targeted path of tracks written onto disk 115. As an example, the servo pattern of track 500 is used to control the position of write element 242 when track 505 is being written. Therefore, if there is a correlation between an error in the shape of track 500 and an error in the shape of track 505, it can be inferred that there is an error in the transfer function used to derive the target paths of tracks 500 and 505. Embodiments of the present invention generate a correction to the f-factor used to position write element 242 to remove correlations in track shape errors in the subsequent propagation of servo patterns of disk 115. In one embodiment, the correction modifies the existing f-factor such that the feed-forward signal used to control the position of write element 242 in a subsequent propagation step will reduce the correlated errors in track shape. In another embodiment, the correction can be used to modify the transfer function used to derive the targeted track shape.

Figure 6:
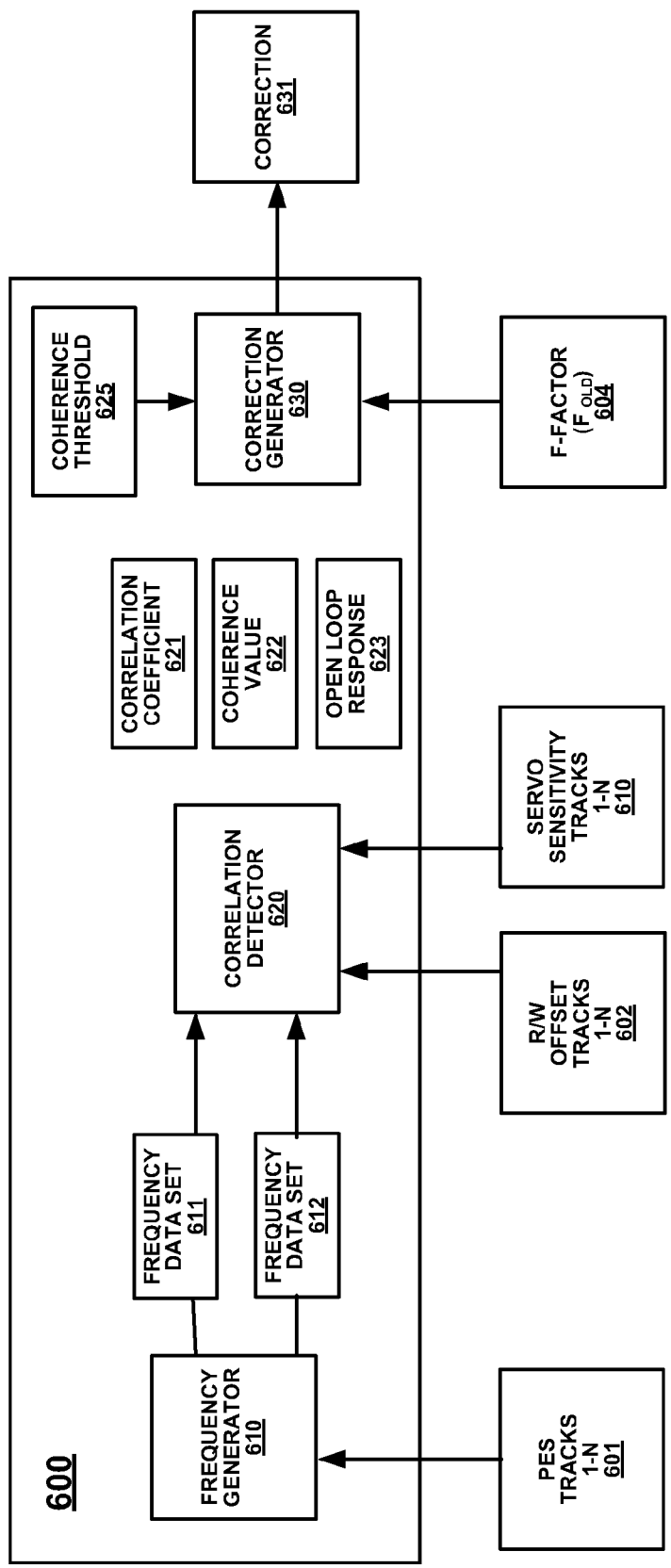
FIG. 6 is a block diagram of an example system for implementing adaptive track shape control during a self servo-write process in accordance with an embodiment of the present invention.

FIG. 6 is a block diagram of an example system 600 for implementing adaptive track shape control during a self servo-write process in accordance with an embodiment of the present invention. In the following discussion of FIG. 6, reference will be made to tracks 505 and 510 of FIG. 5 which are assumed to be one read/write offset apart. In FIG. 6, system 600 comprises a frequency generator 610, a correlation detector 620 and a correction generator 630. In an embodiment, system 600 receives as inputs a position error signal (e.g., PES 601) for each of a plurality of tracks 1-N. In accordance with one embodiment, the PES signals are collected from servo pattern data written upon disk 115 by write element 242 in a self servo-write process. The PES signal data can be stored in a database, volatile memory, non-volatile memory, or received by via a data connection. In general, system 600 is used to generate an open loop transfer function in response to determining a correlation between errors in the shape of tracks written onto disk 115. In one embodiment, the open loop transfer functions of tracks one read/write offset apart are used to determine an adjustment to the f-factor used to control the position of write element 242 when subsequent tracks are written onto disk 115.

In one embodiment, frequency generator 610 performs a discrete Fourier transform (DFT) of the burst signals received from read element 244. As a result, a frequency data set of discrete frequencies corresponding to harmonic frequencies of the fundamental frequency (e.g., the rotation frequency of disk 115) is generated by frequency generator 610. As shown in FIG. 6, frequency data set 611 is generated based upon the PES data from a first track (e.g., 510 of FIG. 5) while frequency data set 612 is generated based upon the PES data from a second track (e.g., 505 of FIG. 5). In accordance with an embodiment of the present invention, the frequency data is based upon a DFT of each of the burst signals used as a PES in propagation of servo patterns on disk 115. For example, as discussed above with reference to FIG. 3A, when the burst data is used as a servo control, the signals of burst fields A, B, and C are used to determine whether read element 244 is properly following track B.

In accordance with one embodiment, the burst data from each track used to generate the PES is transformed into the frequency data sets 611 and 612. Thus, for each servo pattern written onto track 505, the frequency components of each of the burst patterns is transformed into frequency components (e.g., frequency data set 611 of FIG. 6) by frequency generator 610. Similarly, for each servo pattern written onto track 510, the frequency components of each of the burst patterns is transformed into frequency components (e.g., frequency data set 612 of FIG. 6) by frequency generator 610. As an example, frequency data 611 and 612 comprise data of some integer multiples (e.g., 30 frequency harmonics) of the fundamental frequency of disk 115. It is noted that a greater of lesser number of frequency harmonics may be used in accordance with embodiments of the present invention. However, the response time of arm 125 to signals used to control the position of read/write head 240 may render adjustments at the higher harmonic frequencies data of little value as the actuator cannot respond quickly enough.

In FIG. 6, a read/write offset 602 for each of tracks 1-N and a servo sensitivity 603 for tracks 1-N are accessed by correlation detector 620. As described above, the read/write offset between read element 244 and write element 242 is not a fixed value. Due to the geometry of the offset of read element 244 and write element 242, as well as the geometry of actuator arm 125 as it moves from the inside diameter to the outside diameter of disk 115, the read/write offset will constantly change. The data describing changes to the read/write offset as read/write head 240 moves from the inside diameter to the outside diameter of disk 115 can be derived by a separate logic loop (not shown) and provided to system 600. The servo sensitivity data 603 describes the changes in the amplitude of burst signals of a PES. Referring again to FIG. 3A, for track B, the servo sensitivity data (e.g., FIG. 3B) shows that the amplitude of burst signals A and C are both 0.5. However, as read write head 240 is moved to track C (e.g., toward the outside diameter of disk 115), the amplitude of burst signals B and D may change to 0.6 and 0.4 respectively due to changed in the read/write offset and the geometry of arm 125 and disk 115.

In accordance an embodiment, correlation detector 620 accesses frequency data 611 and 612. In one embodiment, correlation detector 620 is configured to create a weighted value for each amplitude of the burst signals comprising PES data for tracks 505 and 510. In one embodiment, lower frequencies are given a higher weighted value than higher frequencies due to the response time sensitivity of the actuator as described above.

In accordance with an embodiment, correlation detector 620 is configured to generate a correlation coefficient 621 which reduces the difference between the PES of track 505 and 510. As an example, if there is a correlation between an error in the track shape of track 505 and an error in the shape of track 510, then there is some constant term (s) which describes the correlation between the two errors in track shape. Thus, a value can be determined by correlation detector 620 which drives the difference between an error in the track shape of track 505 and a corresponding error in the shape of track 510 to zero. An example of an algorithm to calculate a correlation coefficient in accordance with an embodiment of the present invention is given below:

$$\|x*s-y\| \quad (1)$$

where y represents the PES of track 510 and x represents the vector of weighted PES of track 505.

Additionally, correlation detector 620 is configured to generate a coherence value 622. Coherence value 622 is a statistical measure of the correlation between an error in track 505 and a corresponding error in track 510. An example algorithm used to calculate a coherence value in accordance with an embodiment of the present invention is given below:

$$(xTy)(yTx)/(xTx)(yTy) \quad (2)$$

As an example, a coherence value of 1.0 indicates a high correlation between an error in the track shape of track 505 and an error in the track shape of track 510 while a coherence value of 0.1 indicates a low correlation between an error in the track shape of track 505 and an error in the track shape of track 510. In one embodiment, correlation detector 620 utilizes a coherence threshold 625 to determine whether a correction 631 generated by correction generator 630 is to be used to control the position of a write element when a subsequent track is written to disk 115.

In accordance with one embodiment, correction generator 630 accesses the correlation coefficient 621 and coherence value 622 to calculate an open loop response 623 of tracks 505 and 510. An example algorithm used to calculate an open loop response 623 of tracks 505 and 510 in accordance with an embodiment of the present invention is given below:

$$g=(s-f)/(1-s) \quad (3)$$

where g represents the open loop frequency response at a given frequency, s represents the correlation coefficient derived above in algorithm 1, and f represents the f-factor used to control the positioning of read/write head 240 when writing track 510.

In accordance with an embodiment of the present invention, correction generator 630 then generates a correction 631 which modifies the f-factor used to write track 510 to reduce the correlation observed between an error in the shape of track 505 and an error in the shape of track 510. An example algorithm used to calculate correction 631 in accordance with an embodiment of the present invention is given below:

$$F_{hat}=s_{Target}-(1-s_{Target})*g \quad (4)$$

where $F_{hat}$ represents the correction 631, and $s_{Target}$ represents the desired amount of correlation between an error in the shape of track 510 and a subsequently written track which is one read/write offset away from track 510. In an embodiment, based upon the open loop response (g) determined using algorithm 3, correction 631 is used to modify the f-factor used when generating a feed-forward signal to control the position of read/write head 240 when a servo pattern for a subsequent track is written onto disk 115. An example algorithm used to update the f-factor in accordance with an embodiment of the present invention is given below:

$$F_{new}=F_{old}+\sqrt{((coh)(Fhat-F_{old}))} \quad (5)$$

It is further noted that that algorithm 5 is not utilized in every instance. Instead, it is used to reduce the correlation between errors in the shape of tracks one read/write offset apart. If algorithm 5 is not used, the correction to the track one read/write offset from track 510 may be large enough to cause a squeeze of adjacent tracks. In such a situation, data written to one track may be overwritten by data in an adjacent track due to the shape of the tracks. For example, in an instance where there is a high correlation at a low frequency, it is desirable to correct the error(s) in the track shape more gradually. It is noted that the operations describing the operation 600 are intended as an example of adaptive track shape control during a self servo-write process in accordance with an embodiment of the present invention. While the above operations were described with reference to a sample set comprising two tracks only, it is noted that a sample set can comprise any number of tracks.

It is further noted that different rules for calculating $F_{new}$ can be used in accordance with embodiments of the present invention. For example, while algorithm 5 is weighted using the square root of the coherence value, embodiments of the present invention can use other monotonically increasing functions of coherence that map into an interval [0,1]. Additionally, multiple correlation coefficients between tracks one read/write offset apart can be used. These multiple correlation coefficients can be used to determine other weightings to be used in defining the target track as a function of previous tracking errors.

Figure 7:
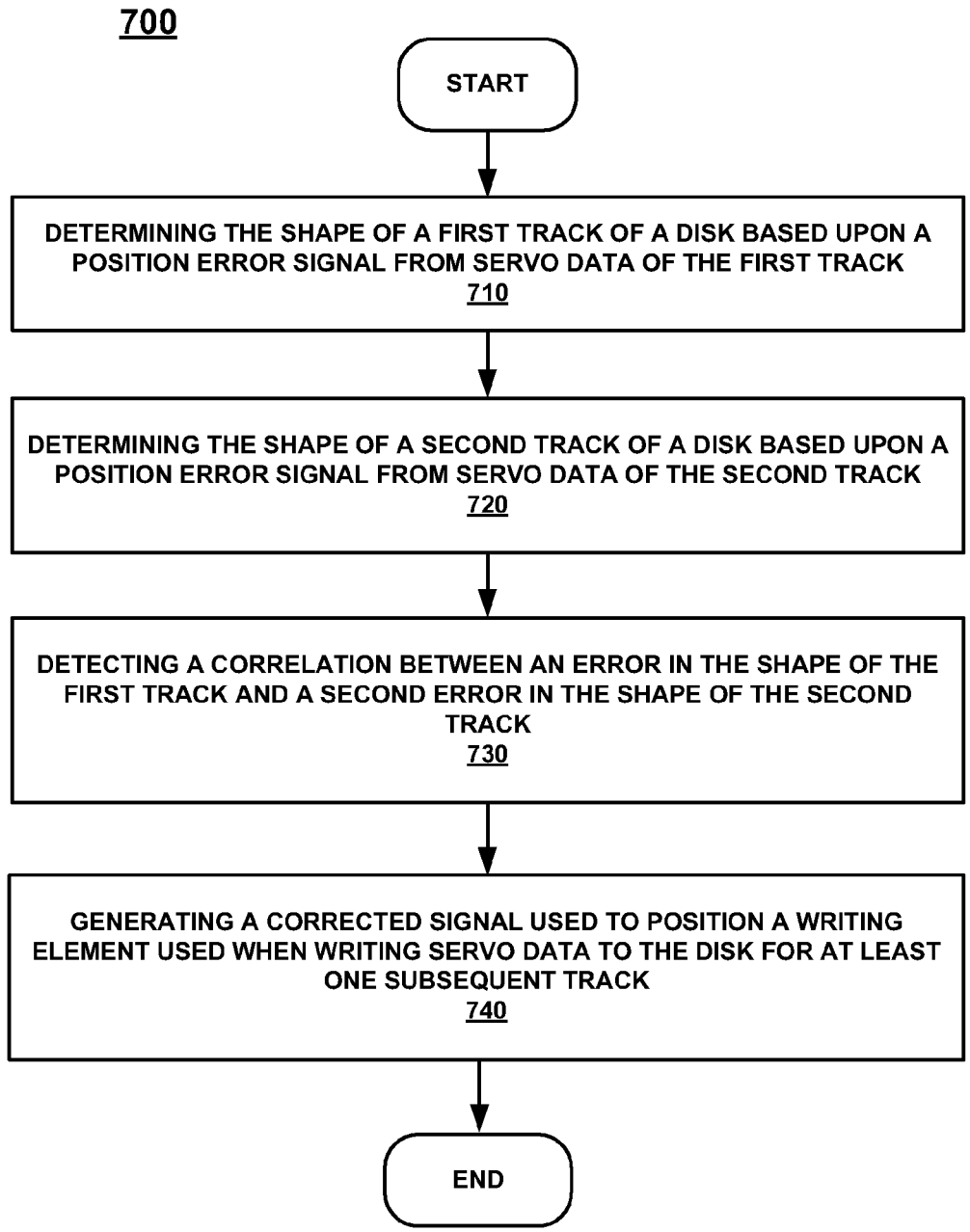
FIG. 7 is a flowchart of a method of adaptive track shape control during a self servo-write process in accordance with an embodiment of the present invention.

FIG. 7 is a flowchart of a method 700 of adaptive track shape control during a self servo-write process in accordance with an embodiment of the present invention. In operation 710 of FIG. 7 the shape of a first track of a disk based upon a position error signal (PES) from servo data of said first track is determined. As described above, frequency generator 610 accesses the PES data for a plurality of tracks and generates frequency data sets 611 and 612. With reference to the discussion of FIG. 6, frequency generator 610 generates frequency data set 611 which comprises a set of discrete frequencies corresponding to harmonic frequencies of the fundamental frequency of disk 115 for track 510.

In operation 720 of FIG. 7, the shape of a second track of said disk based upon a second PES from servo data of said second track is determined. As discussed above, frequency generator 610 performs a DFT on the PES data which breaks the PES data down into frequency components for each servo pattern on a given track. With reference to the discussion of FIG. 6, frequency generator 610 generates frequency data set 612 which comprises a set of discrete frequencies corresponding to harmonic frequencies of the fundamental frequency of disk 115 for track 505.

In operation 730 of FIG. 7, a correlation between an error in the shape of the first track and a second error in the shape of a second track is detected. As discussed above with reference to FIG. 6, correlation detector 620 generates coherence value 622 which is a statistical measure of the correlation between an error in track 505 and a corresponding error in track 510. In one embodiment, if coherence value 622 exceeds a correlation threshold 625, a correction is generated to reduce the correlation between an error in the shape of track 505 and an error in the shape of track 510.

In operation 740 of FIG. 7, a corrected signal used to position a writing element used when writing servo data to the disk for at least one subsequent track is generated. As discussed above, correction 631 comprises a corrected f-factor used when generating a feed-forward signal to control the position of read/write head 240 when a servo pattern for a subsequent track is written onto disk 115.

Figure 8:
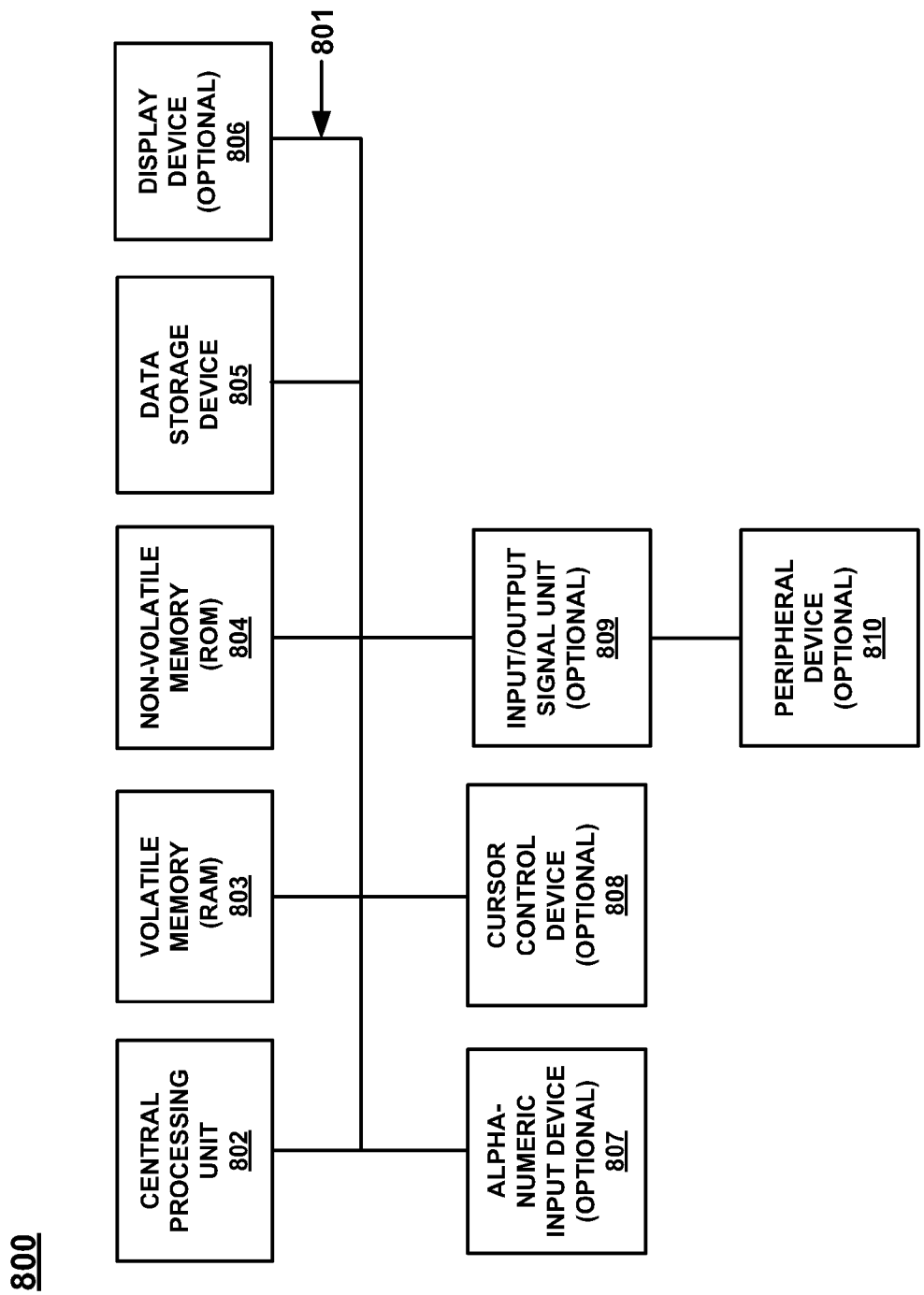
FIG. 8 is a block diagram of an example computer system used to implement adaptive track shape control during a self servo-write process in accordance with an embodiment of the present invention.

With reference to FIG. 8, portions of the present invention are comprised of computer-readable and computer-executable instructions that reside, for example, in computer system 800 which is used as a part of a general purpose computer network (not shown). It is appreciated that computer system 800 of FIG. 8 is exemplary only and that the present invention can operate within a number of different computer systems including general-purpose computer systems, embedded computer systems, laptop computer systems, hand-held computer systems, and stand-alone computer systems. It is noted that computer system 800 can be used to implement system 600 in accordance with embodiments of the present invention.

In the present embodiment, computer system 800 includes an address/data bus 801 for conveying digital information between the various components, a central processor unit (CPU) 802 for processing the digital information and instructions, a volatile main memory 803 comprised of volatile random access memory (RAM) for storing the digital information and instructions, and a non-volatile read only memory (ROM) 804 for storing information and instructions of a more permanent nature. In addition, computer system 800 may also include a data storage device 805 (e.g., a magnetic, optical, floppy, or tape drive or the like) for storing vast amounts of data. It should be noted that the software program for performing method of adaptive track shape control during a self servo-write process according to an embodiment of the present invention can be stored either in volatile memory 803, data storage device 805, or in an external storage device (not shown).

Devices which are optionally coupled to computer system 800 include a display device 806 for displaying information to a computer user, an alpha-numeric input device 807 (e.g., a keyboard), and a cursor control device 808 (e.g., mouse, trackball, light pen, etc.) for inputting data, selections, updates, etc. Computer system 800 can also include a mechanism for emitting an audible signal (not shown).

Returning still to FIG. 8, optional display device 806 of FIG. 8 may be a liquid crystal device, cathode ray tube, or other display device suitable for creating graphic images and alpha-numeric characters recognizable to a user. Optional cursor control device 808 allows the computer user to dynamically signal the two dimensional movement of a visible symbol (cursor) on a display screen of display device 806. Many implementations of cursor control device 808 are known in the art including a trackball, mouse, touch pad, joystick, or special keys on alpha-numeric input 807 capable of signaling movement of a given direction or manner displacement. Alternatively, it will be appreciated that a cursor can be directed and/or activated via input from alpha-numeric input 807 using special keys and key sequence commands. Alternatively, the cursor may be directed and/or activated via input from a number of specially adapted cursor directing devices.

Furthermore, computer system 800 can include an input/output (I/O) signal unit (e.g., interface) 809 for interfacing with a peripheral device 810 (e.g., a computer network, modem, mass storage device, etc.). Accordingly, computer system 800 may be coupled in a network, such as a client/server environment, whereby a number of clients (e.g., personal computers, workstations, portable computers, minicomputers, terminals, etc.) are used to run processes for performing desired tasks. In particular, computer system 800 can be coupled in a system for method of adaptive track shape control during a self servo-write process.

The alternative embodiments of the present invention are thus described. While the present invention has been described in particular embodiments, it should be appreciated that the present invention should not be construed as limited by such embodiments, but rather construed according to the below claims.

What is claimed is:

1. A method of adaptive track shape control during a self servo-write process, said method comprising: detecting a first error in a targeted path for writing servo data onto a first track of a disk; correlating said first error with a second error for a targeted path in a previously written track of said disk which is separated from said first track by one read/write offset whereby said correlating said previously written track is based upon a read/write offset of a writing element and a reading element disposed within a read/write head; generating a correction for a feed-forward signal used to position a writing element which is used to write servo data for a subsequent track of said disk;
wherein said correlating further comprises:
determining a frequency harmonic of said first error based upon a rotation frequency of said disk; and
determining a frequency harmonic of said second error based upon a rotation frequency of said disk; and
performing a discrete Fourier transform of a position error signal to determine said frequency harmonic of said first error; performing a discrete Fourier transform of a second position error signal to determine the frequency of said second error; accessing an offset between said writing element and a read element of a read/write head based upon a location of either of said first track and of said second track on said disk; and determining a measured sensitivity to each of a plurality of burst signals.

2. The method as recited in claim 1 further comprising:
determining a plurality of harmonic values based upon said rotation frequency of said disk; and
assigning a weighted value to at least one of said plurality of harmonic values when generating said correction.

3. The method as recited in claim 1 further comprising:
determining a coherence value describing the correlation between said error and said second error;
generating said correction when said coherence value exceeds a coherence threshold.

4. The method as recited in claim 1 further comprising:
determining a sample set comprising at least one servo writing operation;
using said corrected feed-forward signal to write said at least one subsequent track based upon a size of said sample set;
detecting a correlation between a third error in a shape of said at least one subsequent track and a previously written track which is separated from said at least one subsequent track by one read/write offset; and
correlating said third error with said error for said targeted path of said first track.

5. A method of adaptive track shape control during a self servo-write process, said method comprising:
determining a shape of a first track of a disk based upon a position error signal (PES) from servo data of said first track;

determining a shape of a second track of said disk which is separated from said first track by one read/write offset based upon a second PES from servo data of said second track;

detecting a correlation between an error in the shape of said first track and a second error in the shape of a second track;

generating a corrected feed-forward signal used to position a writing element used when writing servo data to said disk for at least one subsequent track;

accessing an offset between said writing element and a read element of a read/write head based upon the location of either of said first track and of said second track on said disk; and determining a measured sensitivity to each of a plurality of burst signals.

6. The method as recited in claim 5 further comprising:

performing a discrete Fourier transform of said PES to determine the frequency of said error; and performing a discrete Fourier transform of a second PES of said second track to determine the frequency of said second error.

7. The method as recited in claim 5 further comprising:

determining a plurality of harmonic values based upon a rotation frequency of said disk; and assigning a weighted value to at least one of said plurality of harmonic values when generating said corrected feed-forward signal.

8. The method as recited in claim 5 further comprising:

determining a coherence value describing the correlation between said error and said second error;

generating said corrected feed-forward signal when said coherence value exceeds a coherence threshold.

9. The method as recited in claim 5 wherein said detecting said correlation further comprises:

selecting said second track based upon a read/write offset of said writing element and a reading element disposed within said read/write head.

10. The method as recited in claim 5 further comprising:

determining a sample set comprising at least one servo writing operation;

using said corrected feed-forward signal to write said at least one subsequent track based upon the size of said sample set;

detecting a correlation between a third error in the shape of said at least one subsequent track and a previously written track which is separated from said at least one subsequent track by one read/write offset; and correlating said third error with said error for said targeted path of said first track.

* * * * *